United States Patent
Care et al.

(10) Patent No.: US 9,701,584 B2
(45) Date of Patent: Jul. 11, 2017

(54) METHOD OF MANUFACTURING AN ARTICLE FROM POWDER MATERIAL AND AN APPARATUS FOR MANUFACTURING AN ARTICLE FROM POWDER MATERIAL

(71) Applicant: ROLLS-ROYCE PLC, London (GB)

(72) Inventors: Ian Colin Deuchar Care, Derby (GB); Daniel Clark, Derby (GB)

(73) Assignee: ROLLS-ROYCE plc, London (GB)

( * ) Notice: Subject to any disclaimer, the term of this patent is extended or adjusted under 35 U.S.C. 154(b) by 599 days.

(21) Appl. No.: 14/132,754

(22) Filed: Dec. 18, 2013

(65) Prior Publication Data
US 2014/0234151 A1    Aug. 21, 2014

(30) Foreign Application Priority Data
Feb. 20, 2013   (GB) .................................. 1302931.9

(51) Int. Cl.
*B22F 3/12*     (2006.01)
*C04B 35/01*    (2006.01)
(Continued)

(52) U.S. Cl.
CPC ............ *C04B 35/01* (2013.01); *B22F 1/0003* (2013.01); *B22F 3/003* (2013.01); *B22F 3/004* (2013.01); *B22F 3/15* (2013.01)

(58) Field of Classification Search
None
See application file for complete search history.

(56) References Cited

U.S. PATENT DOCUMENTS

RE31,355 E  *  8/1983  Rozmus ................ B22F 3/1208
                                              249/105
4,663,241 A     5/1987  Doherty et al.
(Continued)

FOREIGN PATENT DOCUMENTS

DE   60 2004 005070 T2   11/2007
EP       0 482 220 A1     4/1992
(Continued)

OTHER PUBLICATIONS

Jul. 22, 2013 Search Report issued in British Patent Application No. GB1302931.9.
(Continued)

*Primary Examiner* — Jessee Roe
*Assistant Examiner* — Ngoclan T Mai
(74) *Attorney, Agent, or Firm* — Oliff PLC

(57) ABSTRACT

An apparatus for manufacturing an article from powder material includes a canister, a sorter, a plurality of hoppers and at least one valve. The canister has a predetermined internal shape to define the shape of the powder metal article. The sorter sorts the powder material by the size of the powder particles, the shape of the powder particles and/or the flow characteristics of the powder particles. The hoppers contain powder material with different sizes of powder particles, different shapes of powder particles and/or powder particles with different flow characteristics. The hoppers are arranged to supply the sorted powder material to the canister. The at least one valve controls the proportions of the different powder materials supplied from the one or more of the different hoppers into the canister to control the packing density of the powder material in the canister at all positions in the canister.

18 Claims, 3 Drawing Sheets

(51) Int. Cl.
 *B22F 1/00* (2006.01)
 *B22F 3/00* (2006.01)
 *B22F 3/15* (2006.01)

(56) References Cited

U.S. PATENT DOCUMENTS

| | | | |
|---|---|---|---|
| 4,900,635 A | | 2/1990 | Bowen et al. |
| 5,725,816 A | * | 3/1998 | Sagawa .................. B22F 3/004 |
| | | | 264/102 |
| 7,175,404 B2 | * | 2/2007 | Kondo .................... B22F 3/004 |
| | | | 425/78 |
| 2008/0203612 A1 | * | 8/2008 | Thompson ............. B22D 17/22 |
| | | | 264/219 |

FOREIGN PATENT DOCUMENTS

| | | |
|---|---|---|
| GB | 1 525 290 | 9/1978 |
| JP | A 7-242906 | 9/1995 |
| JP | A 8-302404 | 11/1996 |
| JP | A 10-317013 | 12/1998 |
| WO | 99/25468 A1 | 5/1999 |

OTHER PUBLICATIONS

May 15, 2017 European Search Report issued in European Patent Application No. 13197965.0.

* cited by examiner

METHOD OF MANUFACTURING AN ARTICLE FROM POWDER MATERIAL AND AN APPARATUS FOR MANUFACTURING AN ARTICLE FROM POWDER MATERIAL

The present invention relates to a method of manufacturing an article from powder material and an apparatus for manufacturing an article from powder material, e.g. a method of manufacturing an article by hot pressing a powder material to consolidate and bond the powder material.

Conventionally a gas turbine engine casing is manufactured from a nickel alloy, a steel alloy or a titanium alloy by ring rolling of a forging, for example a compressor casing is manufactured from a ring-roll forged titanium alloy and the ring-roll forged titanium alloy is subsequently machined to final shape. The manufacture of a gas turbine engine casing by machining a ring-roll forging has a high material cost and has a high machining cost.

Hot isostatic pressing of powder material to net-shape is being developed as an alternative method for manufacturing a gas turbine engine casing at a lower material cost and at a lower machining cost. Hot isostatic pressing of powder material currently requires a mild steel canister, a stainless steel canister or a low carbon steel canister which has an internal cavity filled with powder material. The internal cavity of the canister has dimensions calculated to provide a powder material article with the required article shape and dimensions after the hot isostatic pressing is complete. The canister is subsequently removed from the powder material article by machining and/or dissolving in acid.

The powder metal produced by atomisation of molten metal does not have a uniform size and there is a distribution in the size of the powder metal. The distribution in the size of powder metal may vary from batch to batch from the same supplier and from batch to batch from different suppliers. In addition the distribution in the size of powder metal may vary within a batch, for example a batch may be supplied in separate containers each of which has a different distribution in the size of the powder metal.

There are problems with using some powder metals, firstly the tubes supplying the powder metal may become clogged with powder metal and secondly and more importantly some powder metal does not flow easily from the filling sites adjacent to the tubes supplying the powder metal into the canister. This problem is exacerbated if the canister has a complex shape, for example if the canister has recesses to define flanges and/or bosses etc in the finished article.

A problem experienced during the filling of a canister designed to produce a net shape powder metal article is that there may be regions within the canister which have relatively small dimensions through which the powder metal has to flow in order completely fill all of the canister. In this type of canister the powder metal flowing into the canister may form blockages within the region, or regions, of the canister which have relatively small dimensions and these blockages choke, or prevent, the flow of powder metal to other regions of the canister. This will produce a variation in the packing density of the powder metal in the canister and will produce a variation in the shrinkage of the powder metal in the powder metal article.

There is a requirement to accurately predict the final shape and/or the final size of the powder metal article. The final shape and/or the final size of the powder metal article are dependent upon the shrinkage, compaction or consolidation, of the powder metal during the hot isostatic pressing. The shrinkage, compaction or consolidation, is dependent upon the packing density of the powder metal within the canister, because the powder metal compacts in the canister to fill any voids within the canister. A consequence of uneven packing density of the powder metal within a canister is that there is uneven shrinkage within the powder metal article. Another consequence of uneven packing density of the powder metal within a canister is that one powder metal article may have the powder metal packed to a particular density at a particular region and another powder metal article may have the powder metal packed to a different density at the particular region and hence the process does not produce powder metal articles with consistent density at particular regions.

The powder metal supplied by different powder metal suppliers may have differences in the powder metal size distribution, the powder metal shape and/or the powder metal flow properties. This may also result in uneven shrinkage within the powder metal article.

There is a need to uniformly fill canisters such that the packing density of powder metal in each canister and that the packing density of the powder metal at all regions in the canister is the same or that there is a minimum variation in packing density throughout the canister. If there is a variation in the packing density of the powder metal in a canister there is a need for the variation in the packing density of the powder metal in the canister to be the same for all canisters producing a particular powder metal article such that the powder metal articles are produced consistently and predictably the same.

The present invention seeks to provide a novel method of manufacturing an article from powder material which reduces, preferably overcomes, the abovementioned problem.

Accordingly the present invention provides a method of manufacturing an article from powder material comprising,
  a) sorting the powder material by the size of the powder particles, the shape of the powder particles and/or the flow characteristics of the powder particles,
  b) storing the sorted powder material in different hoppers,
  c) providing a canister having a predetermined internal shape to define the shape of the powder material article, the canister having at least one region which is more difficult to fill than other regions,
  d) supplying the powder material from one or more of the different hoppers into the canister to fill the canister, and
  e) controlling the proportions of the powder material supplied from the one or more of the different hoppers into the canister to control the voidage in the powder material in the canister at all positions in the canister, supplying powder material from at least one hopper containing powder particles having a relatively small size, a regular shape and/or good flow characteristics to the canister to fill the at least one region of the canister which is more difficult to fill and/or has a fine tolerance and supplying powder material from at least one hopper containing powder particles having a relatively large size, an irregular shape and/or poor flow characteristics to the canister to fill the other regions of the canister.

The at least one region of the canister which is more difficult to fill and/or has a fine tolerance may be a region where the internal shape of the canister has a projection, a recess, a re-entrant feature and/or a bend.

Step d) may comprise mixing powder material from two or more of the different hoppers and supplying the mixture of powder material into the canister.

Step d) may comprise supplying a mixture of powder material from the at least one hopper containing powder particles having a relatively small size, a regular shape and/or good flow characteristics and powder material from the at least one hopper containing powder particles having a relatively large size, an irregular shape and/or poor flow characteristics to the canister to fill the canister.

Step d) may comprise supplying a greater proportion of powder material from the at least one hopper containing powder particles having a relatively small size, a regular shape and/or good flow characteristics than the proportion of powder material from the at least one hopper containing powder particles having a relatively large size, an irregular shape and/or poor flow characteristics to the canister to fill the at least one region of the canister which is more difficult to fill and/or has a fine tolerance.

Step d) may comprise supplying a greater proportion of powder material from the at least one hopper containing powder particles having a relatively large size, an irregular shape and/or poor flow characteristics than the proportion of powder material from the at least one hopper containing powder particles having a relatively small size, a regular shape and/or good flow characteristics to the canister to fill the other regions of the canister.

The method may further comprise providing a model of the powder material article and the canister, measuring the level of the powder material in the canister, determining from the model of the powder material article and the canister if the level of powder material in the canister is at the at least one region of the canister which is more difficult to fill, and supplying a greater proportion of the powder material from the at least one hopper containing powder particles having a relatively small size, a regular shape and/or good flow characteristics to the canister to fill the at least one region of the canister which is more difficult to fill and/or has a fine tolerance if the level of the powder material in the canister is at the at least one region of the canister which is more difficult to fill and/or has a fine tolerance.

Step d) may comprise supplying recycled powder particles, undersized powder particles, oversized powder particles and/or clean revert powder particles to at least one region of the canister which has a coarse tolerance and/or is subsequently going to be removed.

The powder material may comprise metal particles, ceramic particles or a mixture of metal particles and ceramic particles.

The powder material may comprise nickel alloy particles, titanium alloy particles or steel particles.

Step d) may comprise supplying the powder material into at least one bag and placing the at least one bag in the canister and step e) may comprise controlling the proportions of the powder material supplied from the one or more of the different hoppers into the at least one bag to control the voidage in the powder material in the canister at all positions in the canister.

Steps a) and b) may occur at a first location and step c) may occur at a second location and step d) may comprise supplying the powder material into at least one bag at the first location, transporting the at least one bag to the second location and placing the at least one bag in the canister at the second location and step e) may comprise controlling the proportions of the powder material supplied from the one or more of the different hoppers into the at least one bag to control the voidage in the powder material in the canister at all positions in the canister.

Steps a) and b) may occur at a first location and step c) may occur at a second location and step d) may comprise supplying the powder material into at least one bag at the first location, transporting the at least one bag to the second location and supplying the powder material from the at least one bag into the canister at the second location and step e) may comprise controlling the proportions of the powder material supplied from the one or more of the different hoppers into the at least one bag to control the voidage in the powder material in the canister at all positions in the canister.

The method may comprise
f) sealing the canister, and
g) heating and pressing the canister to compact and consolidate the powder material to form a powder metal article.

The method may include a subsequent heat treatment, an extrusion and or machining.

Step g) may comprise sintering or hot isostatic pressing.

The powder material article may be a gas turbine engine component.

The gas turbine engine component may be a fan casing, a compressor casing, a combustion casing or a turbine casing. The canister may have a substantially annular internal shape to define the shape of the powder material article. The canister may have a radially inner annular wall and a radially outer annular wall, the at least one region which is more difficult to fill than other regions is an annular radially outwardly extending recess in the outer annular wall, is an annular radially inwardly extending recess in the inner annular wall and/or a plurality of circumferentially spaced radially outwardly extending recesses in the outer annular wall.

Alternatively the gas turbine engine component may be a fuel nozzle, an annular seal, a complex bracket or any other suitable gas turbine engine component.

The nickel superalloy may be RR1000 which consists of 18.5 wt % cobalt, 15 wt % chromium, 5 wt % molybdenum, 2 wt % tantalum, 3.6 wt % titanium, 3 wt % aluminium, 0.5 wt % hafnium, 0.06 wt % zirconium, 0.027 wt % carbon, 0.015 wt % boron and the balance nickel plus incidental impurities.

The titanium alloy may be Ti6/4 which consists of 6 wt % vanadium, 4 wt % aluminium and the balance titanium and incidental impurities.

The heating and pressing may be at a temperature of 850° C. to 1250° C. and at a pressure of 50 MPa to 150 MPa. The heating and pressing may be at a temperature of 850° C. to 1000° C. and at a pressure of 50 MPa to 150 MPa for a titanium alloy powder or at a temperature of 1050° C. to 1250° C. and at a pressure of 50 MPa to 150 MPa for a nickel alloy powder.

The powder particles having a relatively small size, a regular shape and/or good flow characteristics may have a diameter of 10 μm or less. The powder particles having a relatively small size, a regular shape and/or good flow characteristics may have an approximately spherical shape.

The powder particles having a relatively large size, an irregular shape and/or poor flow characteristics may have a diameter of 50 μm or more and may have a diameter of up to 500 μm. The powder particles having a relatively large size, an irregular shape and/or poor flow characteristics may have a tear-drop shape, a dog-bone shape, a spider shape etc.

There may be powder particles having an intermediate size, an intermediate shape and/or intermediate flow characteristics and these powder particles may have a diameter of 25 μm to 45 μm and this is the diameter of approximately 50% of the powder particles and is the mass median diameter.

There may be powder particles having poor characteristics such as low density or high shrinkage. Powder particles having low density may be hollow powder particles and powder particles having high shrinkage may be cup-shaped powder particles. These powder particles would normally not be used to manufacture an article from powder particles, but these may be used in the present invention.

The method may comprise manufacturing an article from a plurality of different powder materials comprising,
a) sorting each powder material by the size of the powder particles, the shape of the powder particles and/or the flow characteristics of the powder particles,
b) storing each of the sorted powder materials in different hoppers,
d) supplying the different powder materials to different portions of the canister, supplying the powder material from one or more of the different hoppers of each powder material into the respective portion of the canister to fill the canister, and
e) controlling the proportions of the powder material supplied from the one or more of the different hoppers of each powder material into the respective portion of canister to control the voidage in the powder material in the respective portion of the canister.

The present invention also provides a method of manufacturing an article from powder material comprising,
a) sorting the powder material by the size of the powder particles, the shape of the powder particles and/or the flow characteristics of the powder particles,
b) storing the sorted powder material in different hoppers,
c) providing a canister having a predetermined internal shape to define the shape of the powder metal article, the canister having at least one region which is more difficult to fill than other regions,
d) supplying the powder material from one or more of the different hoppers into the canister to fill the canister, and
e) controlling the amount of powder material supplied from at least one hopper containing powder particles having a relatively small size, a regular shape and/or good flow characteristics and controlling the amount of powder material supplied from at least one hopper containing powder particles having a relatively large size, an irregular shape and/or poor flow characteristics during all stages of the filling of the canister.

The present invention also seeks to provide a novel apparatus for manufacturing an article from powder material.

Accordingly the present invention provides an apparatus for manufacturing an article from powder material comprising,
a canister having a predetermined internal shape to define the shape of the powder metal article, the canister having at least one region which is more difficult to fill than other regions,
a sorter to sort the powder material by the size of the powder particles, the shape of the powder particles and/or the flow characteristics of the powder particles,
a plurality of different hoppers, the hoppers containing powder material with different sizes of powder particles, different shapes of powder particles and/or powder particles with different flow characteristics,
the hoppers being arranged to supply powder material to the canister, and
at least one metering device to control the proportions of the powder material supplied from the one or more of the different hoppers into the canister to control the voidage in the powder material in the canister at all positions in the canister, the at least one metering device being arranged to control the supply of the powder material from one or more of the different hoppers into the canister to fill the canister, the at least one metering device being arranged to supply material from at least one hopper containing powder particles having a relatively small size, a regular shape and/or good flow characteristics to the canister to fill the at least one region of the canister which is more difficult to fill and/or has a fine tolerance and the at least one metering device being arranged to supply material from at least one hopper containing powder particles having a relatively large size, an irregular shape and/or poor flow characteristics to the canister to fill the other regions of the canister.

The at least one region of the canister which is more difficult to fill and/or has a fine tolerance may be a region where the internal shape of the canister has a projection, a recess, a re-entrant feature and/or a bend.

The at least one metering device may be arranged to supply a mixture of powder material from two or more of the different hoppers into the canister.

The at least one metering device may be arranged to supply a mixture of powder material from the at least one hopper containing powder particles having a relatively small size, a regular shape and/or good flow characteristics and powder material from the at least one hopper containing powder particles having a relatively large size, an irregular shape and/or poor flow characteristics to the canister to fill the canister.

The at least one metering device may be arranged to supply a greater proportion of powder material from the at least one hopper containing powder particles having a relatively small size, a regular shape and/or good flow characteristics than the proportion of powder material from the at least one hopper containing powder particles having a relatively large size, an irregular shape and/or poor flow characteristics to the canister to fill the at least one region of the canister which is more difficult to fill and/or has a fine tolerance.

The at least one metering device may be arranged to supply a greater proportion of powder material from the at least one hopper containing powder particles having a relatively large size, an irregular shape and/or poor flow characteristics than the proportion of powder material from the at least one hopper containing powder particles having a relatively small size, a regular shape and/or good flow characteristics to the canister to fill the other regions of the canister.

The apparatus may further comprise a model of the powder material article and the canister, a sensor to measure the level of the powder material in the canister, a processor to determine from the model of the powder material article and the canister the measure level of powder material in the canister if the level of powder material in the canister is at the at least one region of the canister which is more difficult to fill, and the at least one metering device being arranged to supply a greater proportion of the powder material from the at least one hopper containing powder particles having a relatively small size, a regular shape and/or good flow characteristics to the canister to fill the at least one region of the canister which is more difficult to fill and/or has a fine tolerance if the level of the powder material in the canister is at the at least one region of the canister which is more difficult to fill and/or has a fine tolerance.

The processor may be used to compare the level of powder in the canister against the model of powder material article and the canister to ensure that the canister has filled correctly and the powder material has settled to the expected level in the canister.

The at least one metering device may be arranged to supply recycled powder particles, undersized powder particles and/or oversized powder particles and/or clean revert powder particles to at least one region of the canister which has a coarse tolerance and/or is subsequently going to be removed.

The canister may have a substantially annular internal shape to define the shape of the powder material article. The canister may have a radially inner annular wall and a radially outer annular wall, the at least one region which is more difficult to fill than other regions is an annular radially outwardly extending recess in the outer annular wall, is an annular radially inwardly extending recess in the inner annular wall and/or a plurality of circumferentially spaced radially outwardly extending recesses in the outer annular wall.

The at least one metering device may be a valve or a screw conveyor.

The present invention will be more fully described by way of example with reference to the accompanying drawings, in which.

Figure 1:
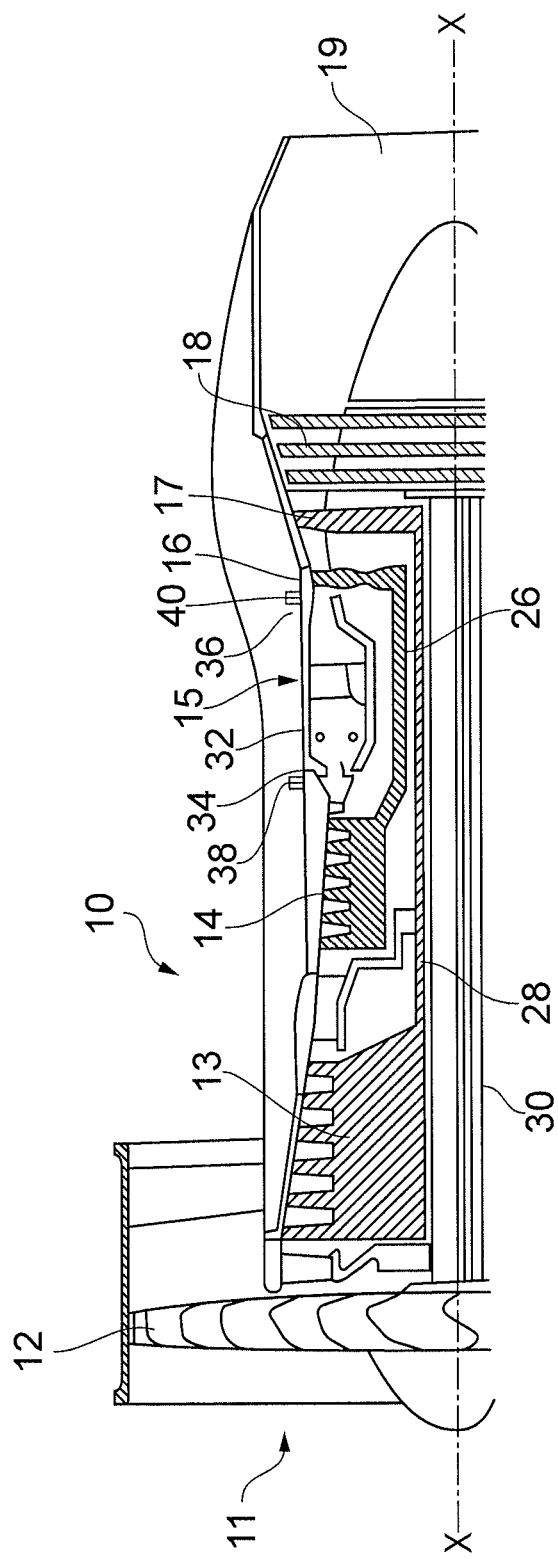
FIG. 1 is partially cut away view of a turbofan gas turbine engine having an article manufactured from powder material according to the present invention.

A turbofan gas turbine engine 10, as shown in FIG. 1, comprises in flow series an intake 11, a fan 12, an intermediate pressure compressor 13, a high pressure compressor 14, a combustor 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustor 15. Fuel is injected into the combustor 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust. The turbofan gas turbine engine 10 has a rotational axis X-X around which the fan 12, each of the compressors 13 and 14 and each of the turbines 16, 17 and 18 are arranged to rotate.

The fan 12, the intermediate pressure compressor 13, the high pressure compressor 14, the combustor 15, the high pressure turbine 16, the intermediate pressure turbine 17 and the low pressure turbine 18 are each enclosed by a respective casing.

Figure 2:
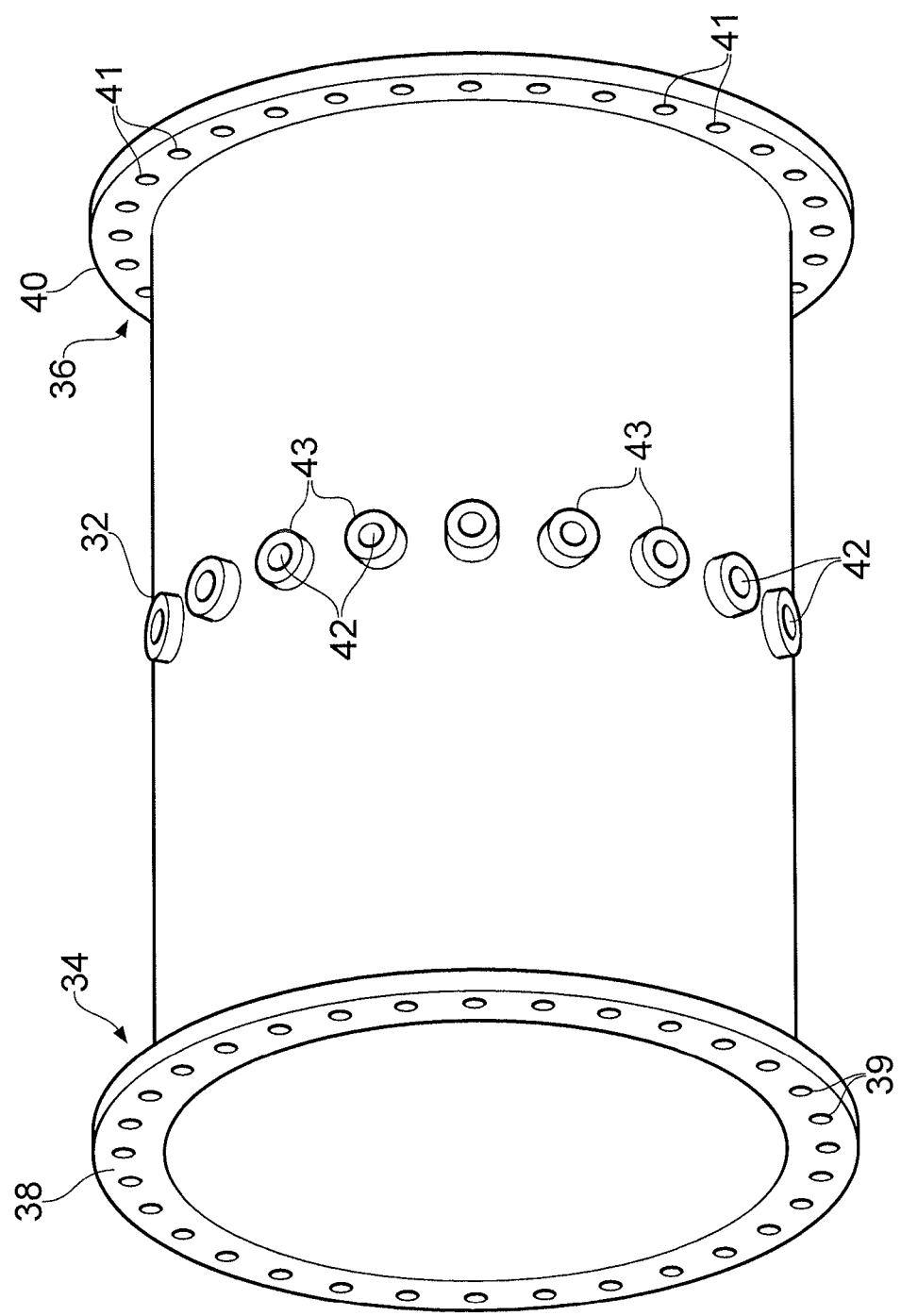
FIG. 2 is an enlarged perspective view of a combustion chamber casing manufactured from powder material according to the present invention.

A combustor casing 32 is shown more clearly in FIG. 2 and the combustor casing 32 comprises an annular radially outwardly extending flange 38 at an upstream end 34 of the combustor casing 32 and an annular radially outwardly extending flange 40 at a downstream end 36 of the combustor casing 32. The flanges 38 and 40 enable the combustor casing 32 to be secured to a casing of the adjacent high pressure compressor 14 and a casing of the high pressure turbine 16. The flanges 38 and 40 have apertures 39 and 41 respectively for bolts and nuts or other suitable fasteners to be used to secure the adjacent casings together. The combustor casing 32 also has a plurality of circumferentially spaced apertures 42, which have associated bosses 43 and threaded blind holes, to allow fuel injectors to be inserted into the combustion chamber 15.

The combustor casing 32 is manufactured by hot isostatic pressing of a powder material, e.g. a powder metal or powder alloy. The powder alloy may be a nickel-base superalloy. The nickel-base superalloy may be Rene 95, 88DT, FGH96, FGH4096 for high temperature applications, CM247LC or RR1000 for intermediate temperature applications or IN718 or Waspaloy for low temperature applications. In this example RR1000 was used. Other suitable nickel-base superalloys are N18, Astroloy, Haynes 282 and ATI Allvac 718t.

Figure 3:
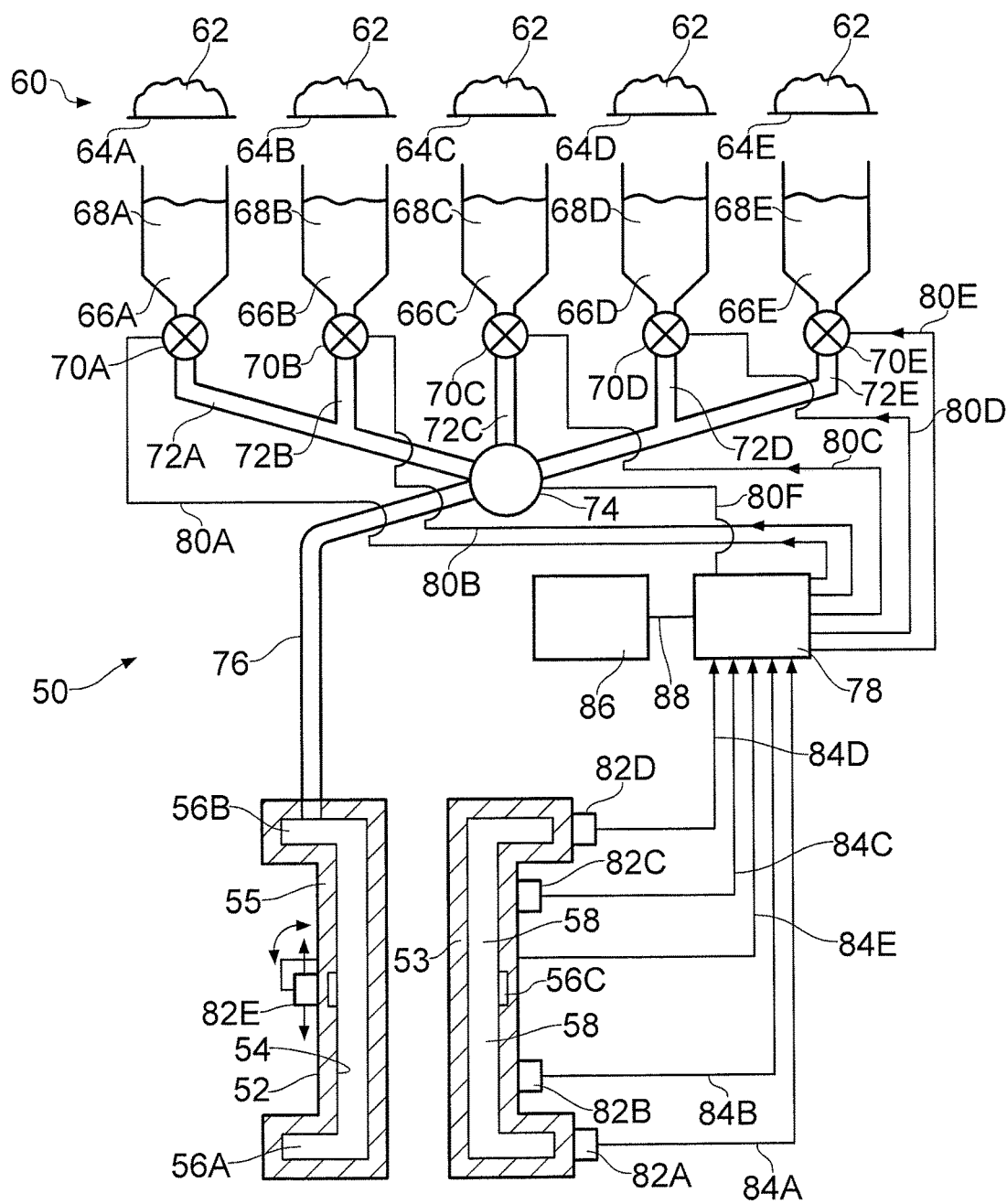
FIG. 3 is a schematic diagram of an apparatus for manufacturing an article from powder material according to the present invention.

An apparatus 50, as shown in FIG. 3, for manufacturing an article, for example combustor casing 32, from powder material comprises a canister 52 which has a predetermined internal shape 54 to define the shape of the powder metal article 32. The canister 52 has at least one region 56A, 56B, 56C which is more difficult to fill than other regions 58. The at least one region 56A, 56B, 56C of the canister 52 which is more difficult to fill and/or has a fine tolerance may be a region where the internal shape of the canister 52 has a projection, a recess, a re-entrant feature and/or a bend with small radius of curvature. The canister 52 has a generally annular internal shape 54 to define the shape of the powder metal combustor casing 32. The canister 52 has a radially inner annular wall 53 and a radially outer annular wall 55. The region 56A which is more difficult to fill than other regions 58 comprises an annular radially outwardly extending recess in the outer annular wall 55, the region 56B which is more difficult to fill than other regions 58 comprises an annular radially outwardly extending recess in the outer annular wall 55 and the regions 56C which are more difficult to fill than other regions 58 comprises a plurality of circumferentially spaced radially outwardly extending recesses in the outer annular wall 55. However, there may be regions which are more difficult to fill than other regions 58 which comprise an annular radially inwardly extending recess in the inner annular wall 53 or a plurality of circumferentially spaced radially inwardly extending recesses in the inner annular wall 53.

The apparatus 50 also comprises a sorter 60 to sort the powder material 62 by the size of the powder particles, the shape of the powder particles and/or the flow characteristics of the powder particles. The sorter 60 comprises a plurality of sieves, or other suitable devices, 64A, 64B, 64C, 64D and 64E to sort the powder material 62. The apparatus 50 comprises a plurality of different hoppers 66A, 66B, 66C, 66D and 66E. The hoppers 66A, 66B, 66C, 66D and 66E contain powder material with different sizes of powder particles, different shapes of powder particles and/or powder particles with different flow characteristics. The sieves 64A, 64B, 64C, 64D and 64E of the sorter 60 are arranged to supply the powder material with different sizes of powder particles, different shapes of powder particles and/or powder particles with different flow characteristics to a respective hopper 66A, 66B, 66C, 66D and 66E. For example the sieve 64A has the finest mesh and the sieve 64E has the coarsest mesh and sieves 64B to 64D have progressively coarser meshes between that of sieve 64A and 64E. Each of the sieves 64A, 64B, 64C, 64D and 64E may have two offset meshes to prevent long thin powder particles getting through. Thus, hopper 66A contains the powder material 68A with powder particles with the finest size and the hopper 66E contains the powder material 68E with powder particles with the coarsest size. The hoppers 66B, 66C and 66D contain powder material 68B, 68C and 68D respectively with progressively coarser powder particles between that off powder material 68A and 68E in hoppers 66A and 66E respectively.

The sorter 60 is arranged to sort the powder material in an inert atmosphere, e.g. argon, helium or nitrogen, at atmospheric pressure. The inert atmosphere may be any suitable clean and dry gas which does not have any impurities to react with or contaminate the power material. There are also sensors, not shown, to measure the humidity and the temperature. Alternatively, the sorter 60 may be arranged to sort the powder material in a vacuum or a vacuum back filled with an inert gas, e.g. argon, helium, or nitrogen.

The hoppers 66A, 66B, 66C, 66D and 66E are arranged to supply powder material 68A, 68B, 68C, 68D and 68E to the canister 52. Valves, or other suitable metering devices, 70A, 70B, 70C, 70D and 70E are arranged to control the supply of the powder material 68A, 68B, 68C, 68D and 68E from each of the different hoppers 66A, 66B, 66C, 66D and 66E respectively into the canister 52 to fill the canister 52. The valves 70A, 70B, 70C, 70D and 70E are located in respective pipes 72A, 72B, 72C, 72D and 72E, which are arranged to supply powder material via a mixer/diverter 74 and a pipe 76 to the canister 52. As mentioned previously the powder material 68A, 68B, 68C, 68D and 68E in each of the different hoppers 66A, 66B, 66C, 66D and 66E have powder particles with different sizes of powder particles, different shapes of powder particles and/or powder particles with different flow characteristics.

As an alternative the sorter 60 may provide a mixture of powder particles to one or more of the hoppers. The mixture of powder particles has predetermined amounts of powder particles with different sizes, different shapes and/or different flow characteristics. The predetermined amounts of each of the types of powder particles may be calibrated by mass or by volume, the volume may change with agitation.

The apparatus 50 further comprises a processor 78, for example a personnel computer (PC), programmable logic controller (PLC) or a computer. The processor 78 is arranged to control the operation of the valves 70A, 70B, 70C, 70D and 70E and the mixer 74 via the electrical control lines 80A, 80B, 80C, 80D, 80E and 80F respectively.

The apparatus 50 also comprises one or more sensors 82A, 82B, 82C, 82D and 82E arranged to detect the level, or depth, of the powder material within the canister 52. The sensors 82A, 82B, 82C, 82D and 82E measure the level of the powder material in the canister 52. The sensors 82A, 82B, 82C, 82D and 82E are arranged to send signals corresponding to the level of the powder material in the canister 52 to the processor 78 via signal lines 84A, 84B, 84C, 84D and 84E respectively. The signal lines may comprise electric lines, e.g. electric cables, optical lines or other suitable lines. The sensors 82A, 82B, 82C and 82D are located at predetermined positions on the canister 52 whereas the sensor 82E is movable longitudinally, axially, or vertically along the canister 52 and also circumferentially around the canister 52. Sensor 82A and 82D are located at the regions 56A and 56B which are more difficult to fill and the sensors 82B and 82C are at the other regions 58. The sensor 82E is movable along and around the canister 52 over regions 56A and 56B which are more difficult to fill and the other regions 58. In particular the sensors 82A and 82D are located at annular radially outwardly extending recesses in the outer annular wall 55, e.g. regions where flanges are to be formed on the powder metal article 32 and the sensor 56E is moved over circumferentially spaced radially outwardly extending recesses in the outer annular wall 55, e.g. regions where bosses are to be formed on the powder metal article 32. The sensors 82A, 82B, 82C, 82D and 82E may comprise an ultrasonic sensor, an X-ray sensor or an optical sensor. The sensors may generally be located and moved automatically and/or robotically or located at fixed positions.

The apparatus 50 additionally comprises a model 86 of the powder material article and the canister 52 and the model 86 provides an input to the processor 78 via electrical line 88. The processor 78 is arranged to determine from the model 86 of the powder material article 32 and the canister 52 in conjunction with the measured depth of the powder material in the canister 52 provided by one or more of the sensors 82A, 82B, 82C, 82D and 82E if the level of powder material in the canister 52 is at the at least one region 56A, 56B or 56C of the canister 52 which is more difficult to fill. If the processor 78 determines that the level of the powder material in the canister 52 is at the at least one region 56A, 56B or 56C of the canister 52 which is more difficult to fill and/or has a fine tolerance then the processor 78 sends operating signals to valves 70A, 70B, 70C, 70D and 70E to supply a greater proportion of the powder material 68A, 68B from the at least one hopper 66A, 66B containing powder particles having a relatively small size, a regular shape and/or good flow characteristics to the canister 52 to fill the at least one region 56A, 56B or 56C of the canister 52 which is more difficult to fill and/or has a fine tolerance.

The processor 78 is arranged to send signals to the valves 70A, 70B, 70C, 70D and 70E to supply powder material 68A, 68B, 68C from at least one hopper 66A, 66B, 66C containing powder particles having a relatively small size, a regular shape and/or good flow characteristics to the canister 52 to fill the at least one region 56A, 56B, 56C of the canister 52 which is more difficult to fill and/or has a fine tolerance and the processor 78 is arranged to send signals to the valves 70A, 70B, 70C, 70D and 70E to supply powder material 68E, 68D, 68C from at least one hopper 66E, 66D, 66C containing powder particles having a relatively large size, an irregular shape and/or poor flow characteristics to the canister 52 to fill the other regions 58 of the canister 52.

The processor 78 may be arranged to send signals to the valves 70A, 70B, 70C, 70D and 70E to supply a mixture of powder material 68A, 68B, 68C, 68D and 68E from two or more of the different hoppers 66A, 66B, 66C, 66D and 66E into the canister 52.

The processor 78 may be arranged to send signals to the valves, or other suitable metering devices, 70A, 70B, 70C, 70D and 70E to supply a mixture of powder material 68A from the at least one hopper 66A containing powder particles having a relatively small size, a regular shape and/or good flow characteristics and powder material 68E from the at least one hopper 66E containing powder particles having a relatively large size, an irregular shape and/or poor flow characteristics to the canister 52 to fill the canister 52.

The processor 78 may be arranged to send signals to the valves 70A, 70B, 70C, 70D and 70E to supply a greater proportion of powder material 68A, 68B from the at least one hopper 66A, 66B containing powder particles having a relatively small size, a regular shape and/or good flow characteristics than the proportion of powder material 68D, 68E from the at least one hopper 66D, 66E containing powder particles having a relatively large size, an irregular shape and/or poor flow characteristics to the canister 52 to fill the at least one region 56A, 56B, 56C of the canister 52 which is more difficult to fill and/or has a fine tolerance.

The processor 78 may be arranged to send signals to the valves 70A, 70B, 70C, 70D and 70E to supply a greater proportion of powder material 68E, 68D from the at least one hopper 66E, 66D containing powder particles having a relatively large size, an irregular shape and/or poor flow characteristics than the proportion of powder material 68A, 68B, 68C from the at least one hopper 66A, 66B, 66C containing powder particles having a relatively small size, a regular shape and/or good flow characteristics to the canister 52 to fill the other regions 58 of the canister 52.

Thus the present invention is concerned with controlling the shrinkage of the powder material during the consolidation of the powder material. The greater the size of the powder material particles the greater is the size of the interstitial volume and hence the greater is the amount of shrinkage during the consolidation of the powder material and this is due to the greater amount of space, or gaps, around larger powder material particles than smaller powder material particles. Thus, the present invention controls the shrinkage of the powder material by controlling or selecting the size of the powder material particles and controlling or selecting the shape of the powder material particles. The present invention allows the use of larger powder material particles in regions of the article where shrinkage, or density, in the finished article is not important, e.g. attachment lugs or features subsequently removed. The present invention controls the proportions of the powder material supplied from each of the different hoppers into the canister to control the voidage and/or shrinkage in the powder material in the canister at all positions in the canister in order to produce consistent and repeatable results. The present invention enables the use of a fixed "recipe" for the proportions of powder material supplied from each of the different hoppers into the canister to produce consistent powder material articles and also enables the fixed "recipe" for the proportions of powder material supplied from each of the different hoppers to be adjusted, or changed, to provide small adjustments to the final shape of the powder material article rather than by changing the internal shape and/or dimensions of the canister.

During the filling of the canister 52 the canister 52 may inclined, or tipped, to ensure the powder material entering through the tube 76 is guided to the correct position. In addition from the measured level of the powder material within the canister 52 from one or more of the sensors 82A, 82B, 82C, 82D and 82E and the model 86 of the powder material article and the canister 52, the processor 78 may determine if agitation of the canister 52 is required and the processor 78 may instigate local agitation of the canister 52, or agitation of the whole of the canister 52, to consolidate the powder material and/or to release powder material which has become stuck in the wrong place in the canister 52, or to release powder material which is blocking the flow of powder material in the canister 52.

In one example the processor 78 is arranged to send signals to close the valves 70B, 70C, 70D and 70E and to open the valve 70A such that powder material 68A only is supplied to the at least one region 56A, 56B or 56C of the canister 52 which is more difficult to fill and/or has a fine tolerance. In another example the processor 78 is arranged to send signals to close the valves 70C, 70D and 70E and to open the valves 70A and 70B such that powder material 68A and 68B only is supplied to the at least one region 56A, 56B or 56C of the canister 52 which is more difficult to fill and/or has a fine tolerance. In this example the proportion of powder material 68A is equal to or greater than that of the powder material 68B. In a further example the processor 78 is arranged to send signals to close the valves 70D and 70E and to open the valves 70A, 70B and 70C such that powder material 68A and 68B only is supplied to the at least one region 56A, 56B or 56C of the canister 52 which is more difficult to fill and/or has a fine tolerance. In this example the proportions of the powder materials 68A, 68B and 68C are equal or the proportion of the powder material 68A is greater than that of the powder material 68B which is greater than that of the powder material 68C.

The processor 78 is arranged to send signals such that all the valves 70A, 70B, 70C, 70D and 70E are open but that the proportion of the powder material 68A is greater than that of the powder material 68B, the proportion of powder material 68B is greater than that of the powder material 68C, the proportion of powder material 68C is greater than that of the powder material 68D and the proportion of powder material 68D is greater than that of the powder material 68E.

It is also possible to provide an additional hopper containing recycled powder particles and an additional valve. The additional valve may be arranged to supply recycled powder particles, undersized powder particles and/or oversized powder particles and/or clean revert material to at least one region of the canister which has a coarse tolerance and/or is subsequently going to be removed. By using these types of powder particles, the quantity of powder material returned to the supplier is reduced or the quantity of powder material recycled through the remanufacturing of the powder material.

Most powder material, powder metal, consists of spherical particles. However, the nickel base superalloy known as RR1000 consists of approximately 90% spherical particles, 8% spherical particles with smaller particles attached thereto and approximately 2% irregular shaped particles. RR1000 consists of 18.5 wt % cobalt, 15 wt % chromium, 5 wt % molybdenum, 2 wt % tantalum, 3.6 wt % titanium, 3 wt % aluminium, 0.5 wt % hafnium, 0.06 wt % zirconium, 0.027 wt % carbon, 0.015 wt % boron and the balance nickel plus incidental impurities.

In operation a supply of powder material, powder metal, 68A, 68B, 68C, 68D and 68E is maintained in the hopper 66A, 66A, 66C, 66D and 66E and the powder material 68A, 68B, 68C, 68D and 68E is maintained in an inert atmosphere, e.g. argon, helium or nitrogen, at atmospheric pressure within the hoppers 66A, 66A, 66C, 66D and 66E. The inert atmosphere may be any suitable clean and dry gas which does not have any impurities to react with or contaminate the power metal. The canister 52 is initially rinsed with alcohol to remove moisture, or water, from the canister. The canister 52 is then heated to remove the alcohol from the canister 52. The canister 52 is then purged with an inert atmosphere, e.g. argon, helium or nitrogen or any suitable clean and dry gas which does not have any impurities to react with or contaminate the power metal. The canister 52 is purged with the inert atmosphere either during the heating of the canister 52 to remove the alcohol or just after the heating of the canister 52 to remove the alcohol. The canister 52 is purged with a flow of inert gas at a flow rate of 18 to 20 liters per minute or a higher flow rate. The hoppers 66A, 66A, 66C, 66D and 66E and the canister 52 are then connected together via the pipe 76 in a sealed chamber, e.g. a bag, to prevent air entering the canister 52 and/or the hoppers 66A, 66A, 66C, 66D and 66E.

During the filling of the canister 52 with powder metal 68A, 68B, 68C, 68D and 68E from the hoppers 66A, 66A, 66C, 66D and 66E the canister 52 is heated to prevent the condensation of moisture in the canister 52 and to aid the flow of the powder metal 68A, 68B, 68C, 68D and 68E within the canister 52 from the point or points of supply of powder metal 68A, 68B, 68C, 68D and 68E into the canister 52. The hoppers 66A, 66A, 66C, 66D and 66E are positioned at a position above the canister 52 so that there is a flow of powder metal 68A, 68B, 68C, 68D and 68E from the hoppers 66A, 66A, 66C, 66D and 66E to the canister 52 due to gravity. In addition a pressure difference is maintained between the hoppers 66A, 66A, 66C, 66D and 66E and the canister 52 to aid the flow of powder metal 68A, 68B, 68C, 68D and 68E into the canister 52 from the hoppers 66A, 66A, 66C, 66D and 66E to assist the gravity feed of powder metal 68A, 68B, 68C, 68D and 68E from the hoppers 66A, 66A, 66C, 66D and 66E to the canister 52.

During the filling of the canister 52 with the powder material 68A, 68B, 68C, 68D, 68E the canister 52 may vibrated to assist in distributing the powder material 68A, 68B, 68C, 68D, 68E around the canister 52 to ensure that the powder metal 68A, 68B, 68C, 68D, 68E fills the whole of the canister 52 and to pack the powder material into the canister 52 to the required packing density. This is especially important for a complex shaped canister 52 which includes recesses etc to define bosses and/or flanges on the finished powder metal article 32. The method may comprise vibrating the canister 52 at a frequency in the range of 10 to 100 Hz. The method may comprise vibrating the canister 52 at a frequency of 10 to 20 Hz. The method may comprise localised vibration of the canister 52 to assist local packing of the powder material into the canister 52 and/or to unblock powder material when it is stuck in the wrong place or is blocking the flow of powder material. The vibration of the canister 52 is typically near the resonant frequency of the powder material particles, about 2 kHz, in order to unblock a blockage and then the frequency of vibration is reduced in order for the powder material to consolidate, pack. The localised vibration may be carried out using an ultrasonic vibrator.

After the canister 52 is completely filled with powder metal 68A, 68B, 68C, 68D, 68E, a leak check is performed by applying a vacuum to the canister 52 and determining if any gas leaks into the canister 52 by measuring the pressure within the canister 52 to determine if the pressure rises within the canister 52. If the canister 52 passes the leak check the tubes 76 are sealed by crimping and then the tubes 76 are further sealed by welding, e.g. spot welding etc.

The evacuated and sealed canister 52 containing power metal 68A, 68B, 68C, 68D, 68E is then placed in a HIP vessel and hot isostatically pressed at a high temperature and high pressure to consolidate the powder metal and diffusion bond the powder metal particles together to form a powder metal article 32. The canister 52 is then removed from the powder metal article 32 by machining the canister 52 and/or dissolving the canister 52 in acid.

Alternatively, the canister 52 may be a multi-part canister 52 which may be removed from the powder metal article 32.

The powder metal article 32 may be a net shape article which only requires a minor amount of machining to provide apertures 42 through bosses 43 and/or apertures 39 and 41 through flanges 38 and 40 and finish machining of the bosses 43 and flanges 38 and 40 etc.

It may be possible to use a screw conveyor or other suitable metering device in substitution for a valve in each of the embodiments of the present invention.

In the present invention one of the hoppers may have a different alloy to the other hoppers, for example most of the hoppers may have a titanium alloy or a nickel superalloy and one of the hoppers may have commercially pure titanium or a different titanium alloy or commercially pure nickel or a different nickel superalloy respectively.

This may allow some portions of the component to consist of different alloys/metals to the other portions, e.g. the composition of the flanges of a casing is different to the composition of the cylinder of the casing.

In another embodiment of the present invention a plurality of the hoppers have a first powder material for example a first metal or alloy, e.g. a first titanium alloy or first nickel alloy, and each of these hoppers has powder particles of the first powder material with different sizes, shapes and/or flow characteristics and a plurality of the hoppers have a second powder material for example a second metal or alloy, e.g. a second titanium alloy or a second nickel alloy, and each of these hoppers has powder particles of the first powder material with different sizes, shapes and/or flow characteristics. This embodiment allows different portions of the component, e.g. different axial portions of the casing, to have different compositions and controls the proportions of the powder material supplied from each of the different hoppers containing the first and second powder materials into the canister to control the voidage and/or shrinkage of the first and second powder materials in the canister at all positions in the canister. Similarly three or more different powder materials may be used at different positions in the canister to produce a component with many different compositions and controls the proportions of the powder material supplied from each of the different hoppers containing all the different powder materials into the canister to control the voidage and/or shrinkage of all the different powder materials in the canister at all positions in the canister. Thus the present invention may be used to manufacture an article from a plurality of different powder materials comprising, sorting each powder material by the size of the powder particles, the shape of the powder particles and/or the flow characteristics of the powder particles, storing each of the sorted powder materials in different hoppers, supplying the different powder materials to different portions of the canister, supplying the powder material from one or more of the different hoppers of each powder material into the respective portion of the canister to fill the canister, and controlling the proportions of the powder material supplied from the one or more of the different hoppers of each powder material into the respective portion of canister to control the voidage in the powder material in the respective portion of the canister.

The present invention may also supply the powder material into a bag, or a shaped bag, rather than directly into the canister and the bag is placed in the canister. The present invention controls the proportions of the powder material supplied from the one or more of the different hoppers into the bag to control the voidage in the powder material in the canister at all positions in the canister. The bag may be removed from the canister by piercing the bag and controlling the extraction of the bag from the canister or the bag may remain in the canister. The bag may be removed from the canister by mechanical extraction of the bag or by thermal decomposing the bag. The bag may remain in the canister if it is metallic, e.g. nickel foil, or if it is ceramic and/or comprises woven fibres. The proportions of the powder material supplied from the one or more of the different hoppers into the bag at each position in the bag correspond to the proportions of the powder material from the one or more different hoppers required for a corresponding position in the canister.

Alternatively the present invention may also supply the powder material into a plurality of bags, or a plurality of shaped bags, rather than directly into the canister and the bags are placed into the canister in a specific order. The present invention may control the proportions of the powder material supplied from the one or more of the different hoppers into each of the bags to control the voidage in the powder material in the canister at all positions in the canister. All of the bags may be removed from the canister by piercing the respective bag and controlling the extraction of the respective bag from the canister or all of the bags may remain in the canister. The bags may be removed from the canister by mechanical extraction of the bags or by thermal decomposition of the bags. The bags may remain in the canister if they are metallic, e.g. nickel foil, or if they are ceramic and/or comprise woven fibres. The proportions of the powder material supplied from the one or more of the different hoppers into each bag at each position in the bag correspond to the proportions of the powder material from the one or more different hoppers required for a corresponding position in the canister.

The powder material may be sorted and stored and the canister provided at the same location. The canister or the bag, or bags, may be filled with powder material at the same location. The bag or bags may be placed in the canister in a predetermined order or the bag or bags may supply the powder material into the canister in a predetermined order.

The powder material may be sorted and stored at a first location and the canister may be provided at a second location. The bag, or bags, may be filled with powder material at the first location and the bag or bags may be used to transport the powder material to the canister at the second location. The bag or bags may then be placed in the canister in a predetermined order or the bag or bags may supply the powder material into the canister in a predetermined order.

Alternatively the powder material may be sorted at a first location, the powder material may be stored at a second location and the canister may be provided at the second location. The sorted powder may be transported in containers to the second location and supplied from each canister into a respective hopper at the second location. The canister or the bag, or bags, may be filled with powder material at the second location. The bag or bags may then be placed in the canister in a predetermined order or the bag or bags may supply the powder material into the canister in a predetermined order.

In a further alternative the powder material may be sorted at a first location, the powder material may be stored at a second location and the canister may be provided at a third location. The sorted powder may be transported in respective containers to the second location and supplied from each canister into a respective hopper at the second location. The bag, or bags, may be filled with powder material at the second location and the bag or bags may be used to transport the powder material to the canister at the third location. The bag or bags may then be placed in the canister in a predetermined order or the bag or bags may supply the powder material into the canister in a predetermined order.

A region of the canister which has a fine tolerance is a region in which the predetermined internal shape of the canister is accurately, or precisely, produced or prepared to accurately, or precisely, define the shape of the powder material article. A region of the canister which has a coarse tolerance is a region in which the predetermined internal shape of the canister is less accurately, or less precisely, produced or prepared to less accurately, or less precisely, define the shape of the powder material article. Thus, the shape and dimensions of the powder material article is within predetermined minimum and maximum limits. The shape and dimensions of the powder material article in the region of the canister with a fine tolerance has a smaller difference between the predetermined minimum and maximum limits than the region of the canister with a coarse tolerance.

Clean revert powder particles are powder particles which are suitable for recycling. In particular clean revert powder particles are powder particles which are not normally used in the production of the powder material article but are recycled, e.g. the powder particles are re-melted and re-atomised to produce further batches of powder particles. The clean revert powder particles are powder particles which have dimensions above a predetermined size and/or irregular shape and are considered unsuitable for manufacturing the powder material article. According to the present invention the clean revert powder particles may be used in particular regions of the powder material article, instead of re-melting and re-atomising, to reduce the cost of powder particles and hence the cost of producing the powder material article. For example the powder particles, powder metal particles, with diameters, dimensions, in the range of 10 µm to 45 µm are used to produce the powder material article and the clean revert powder particles, clean revert metal particles, which have diameters, dimensions, greater than 50 µm which are not normally used may be used in particular regions of powder material article. Thus, the clean revert powder particles, the recycled powder particles and the oversized powder particles have a relatively large size or have an irregular shape.

Although the present invention has been described with reference to powder metal it is equally applicable to the manufacture of a powder ceramic article from powder ceramic or the manufacture of a cermet article from a combination of powder metal and powder ceramic.

Although the present invention has been described with reference to manufacturing an annular casing for a gas turbine engine it is equally applicable to the manufacture of other gas turbine engine components and to components for other engines, machines for example valves, pipe connectors etc.

The invention claimed is:

1. A method of manufacturing an article from powder material comprising,
    a) sorting the powder material by the size of the powder particles, the shape of the powder particles and/or the flow characteristics of the powder particles,
    b) storing the sorted powder material in different hoppers,
    c) providing a canister having a predetermined internal shape to define the shape of the powder material article, the canister having at least one region which is more difficult to fill than other regions,
    d) supplying the powder material from one or more of the different hoppers into the canister to fill the canister,
    e) controlling the proportions of the powder material supplied from the one or more of the different hoppers into the canister to control the voidage in the powder material in the canister at all positions in the canister, supplying powder material from at least one hopper containing powder particles having a relatively small size, a regular shape and/or good flow characteristics to the canister to fill the at least one region of the canister which is more difficult to fill and/or has a fine tolerance and supplying powder material from at least one hopper containing powder particles having a relatively large size, an irregular shape and/or poor flow characteristics to the canister to fill the other regions of the canister, f) sealing the canister, and g) heating and pressing the canister to compact and consolidate the powder material to form a powder metal article.

2. A method of manufacturing an article from powder material comprising, a) sorting the powder material by the size of the powder particles, the shape of the powder particles and/or the flow characteristics of the powder particles, b) storing the sorted powder material in different hoppers, c) providing a canister having a predetermined internal shape to define the shape of the powder material article, the canister having at least one region which is more difficult to fill than other regions, d) supplying the powder material from one or more of the different hoppers into the canister to fill the canister, e) controlling the proportions of the powder material supplied from the one or more of the different hoppers into the canister to control the voidage in the powder material in the canister at all positions in the canister, supplying powder material from at least one hopper containing powder particles having a relatively small size, a regular shape and/or good flow characteristics to the canister to fill the at least one region of the canister which is more difficult to fill and/or has a fine tolerance and supplying powder material from at least one hopper containing powder particles having a relatively large size, an irregular shape and/or poor flow characteristics to the canister to fill the other regions of the canister, f) sealing the canister, and g) heating and pressing the canister to compact and consolidate the powder material to form a powder metal article, wherein the at least one region of the canister which is more difficult to fill and/or has a fine tolerance is a region where the internal shape of the canister has a projection, a recess, a re-entrant feature and/or a bend.

3. A method as claimed in claim 2, wherein step d) comprises mixing powder material from two or more of the different hoppers and supplying the mixture of powder material into the canister.

4. A method as claimed in claim 3 wherein step d) comprises supplying a mixture of powder material from the at least one hopper containing powder particles having a relatively small size, a regular shape and/or good flow characteristics and powder material from the at least one hopper containing powder particles having a relatively large size, an irregular shape and/or poor flow characteristics to the canister to fill the canister.

5. A method as claimed in claim 4 wherein step d) comprises supplying a greater proportion of powder material from the at least one hopper containing powder particles having a relatively small size, a regular shape and/or good flow characteristics than the proportion of powder material from the at least one hopper containing powder particles having a relatively large size, an irregular shape and/or poor flow characteristics to the canister to fill the at least one region of the canister which is more difficult to fill and/or has a fine tolerance.

6. A method as claimed in claim 4 wherein step d) comprises supplying a greater proportion of powder material from the at least one hopper containing powder particles having a relatively large size, an irregular shape and/or poor flow characteristics than the proportion of powder material from the at least one hopper containing powder particles having a relatively small size, a regular shape and/or good flow characteristics to the canister to fill the other regions of the canister.

7. A method of manufacturing an article from powder material comprising, a) sorting the powder material by the size of the powder particles, the shape of the powder particles and/or the flow characteristics of the powder particles, b) storing the sorted powder material in different hoppers, c) providing a canister having a predetermined internal shape to define the shape of the powder material article, the canister having at least one region which is more difficult to fill than other regions, d) supplying the powder material from one or more of the different hoppers into the canister to fill the canister, e) controlling the proportions of the powder material supplied from the one or more of the different hoppers into the canister to control the voidage in the powder material in the canister at all positions in the canister, supplying powder material from at least one hopper containing powder particles having a relatively small size, a regular shape and/or good flow characteristics to the canister to fill the at least one region of the canister which is more difficult to fill and/or has a fine tolerance and supplying powder material from at least one hopper containing powder particles having a relatively large size, an irregular shape and/or poor flow characteristics to the canister to fill the other regions of the canister, f) sealing the canister, and g) heating and pressing the canister to compact and consolidate the powder material to form a powder metal article, further comprising providing a model of the powder material article and the canister, measuring the level of the powder material in the canister, determining from the model of the powder material article and the canister if the level of powder material in the canister is at the at least one region of the canister which is more difficult to fill, and supplying a greater proportion of the powder material from the at least one hopper containing powder particles having a relatively small size, a regular shape and/or good flow characteristics to the canister to fill the at least one region of the canister which is more difficult to fill and/or has a fine tolerance if the level of the powder material in the canister is at the at least one region of the canister which is more difficult to fill and/or has a fine tolerance.

8. A method as claimed in claim 2, wherein step d) comprises supplying recycled powder particles, undersized powder particles and/or oversized powder particles and/or clean revert powder particles to at least one region of the canister which has a coarse tolerance and/or is subsequently going to be removed.

9. A method as claimed in claim 2, wherein the powder material is selected from the group consisting of metal particles, ceramic particles and a mixture of metal particles and ceramic particles.

10. A method as claimed in claim 9 wherein the powder material is selected from the group consisting of nickel alloy particles, titanium alloy particles and steel particles.

11. A method as claimed in claim 2, wherein step g) is selected from the group consisting of sintering and hot isostatic pressing.

12. A method as claimed in claim 2, wherein the powder material article is a gas turbine engine component.

13. A method as claimed in claim 12 wherein the gas turbine engine component is selected from the group consisting of a fan casing, a compressor casing, a combustion casing and a turbine casing.

14. A method as claimed in claim 13 wherein the canister having a substantially annular internal shape to define the shape of the powder material article.

15. A method as claimed in claim 14 wherein the canister having a radially inner annular wall and a radially outer annular wall, the at least one region which is more difficult to fill than other regions is an annular radially outwardly extending recess in the outer annular wall, is an annular radially inwardly extending recess in the inner annular wall and/or a plurality of circumferentially spaced radially outwardly extending recesses in the outer annular wall.

16. A method as claimed in claim 2, wherein step e) comprises controlling the amount of powder material supplied from at least one hopper containing powder particles having a relatively small size, a regular shape and/or good flow characteristics and controlling the amount of powder material supplied from at least one hopper containing powder particles having a relatively large size, an irregular shape and/or poor flow characteristics during all stages of the filling of the canister.

17. A method as claimed in claim 2, comprising manufacturing an article from a plurality of different powder materials, comprising
   a) sorting each powder material by the size of the powder particles, the shape of the powder particles and/or the flow characteristics of the powder particles,
   b) storing each of the sorted powder materials in different hoppers,
   d) supplying the different powder materials to different portions of the canister, supplying the powder material from one or more of the different hoppers of each powder material into the respective portion of the canister to fill the canister, and
   e) controlling the proportions of the powder material supplied from the one or more of the different hoppers of each powder material into the respective portion of canister to control the voidage in the powder material in the respective portion of the canister.

18. A method of manufacturing an article from powder material comprising,
   a) sorting the powder material by the size of the powder particles, the shape of the powder particles and/or the flow characteristics of the powder particles,
   b) storing the sorted powder material in different hoppers,
   c) providing a canister having a predetermined internal shape to define the shape of the powder material article, the canister having at least one region which is more difficult to fill than other regions,
   d) supplying the powder material from one or more of the different hoppers into the canister to fill the canister,
   e) controlling the proportions of the powder material supplied from the one or more of the different hoppers into the canister to control the voidage in the powder material in the canister at all positions in the canister, supplying powder material from at least one hopper containing powder particles having a relatively small size, a regular shape and/or good flow characteristics to the canister to fill the at least one region of the canister which is more difficult to fill and/or has a fine tolerance and supplying powder material from at least one hopper containing powder particles having a relatively large size, an irregular shape and/or poor flow characteristics to the canister to fill the other regions of the canister,
   providing a model of the powder metal article and the canister,
   measuring the level of the powder material in the canister,
   determining from the model of the powder material article and the canister if the level of powder material in the canister is at the at least one region of the canister which is more difficult to fill, and supplying a greater proportion of the powder material from the at least one hopper containing powder particles having a relatively small size, a regular shape and/or good flow characteristics to the canister to fill the at least one region of the canister which is more difficult to fill and/or has a fine tolerance if the level of the powder material in the canister is at the at least one region of the canister which is more difficult to fill and/or has a fine tolerance.

* * * * *